US012448863B2

(12) United States Patent
Xing et al.

(10) Patent No.: US 12,448,863 B2
(45) Date of Patent: Oct. 21, 2025

(54) MOLDED ARTICLES OF MODIFIED POLYGLYCOLIC ACID FOR DEGRADABLE DOWNHOLE TOOLS APPLICATION

(71) Applicants: CNPC USA CORP., Houston, TX (US); BEIJING HUAMEI, INC., Beijing (CN); CHINA NATIONAL PETROLEUM CORPORATION, Beijing (CN)

(72) Inventors: Peixiang Xing, Houston, TX (US); Min (Mark) Yuan, Houston, TX (US); Jiaxiang (Jason) Ren, Houston, TX (US); Peng Cheng, Houston, TX (US); Yu Liu, Beijing (CN); Zhenzhou Yang, Beijing (CN)

(73) Assignees: CNPC USA CORPORATION, Houston, TX (US); BEIJING HUAMEI, INC., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 81 days.

(21) Appl. No.: 18/497,632

(22) Filed: Oct. 30, 2023

(65) Prior Publication Data
US 2025/0137347 A1   May 1, 2025

(51) Int. Cl.
E21B 33/13    (2006.01)
C08L 67/04    (2006.01)

(52) U.S. Cl.
CPC .............. E21B 33/13 (2013.01); C08L 67/04 (2013.01); E21B 2200/08 (2020.05)

(58) Field of Classification Search
CPC ....................................................... C09K 8/42
See application file for complete search history.

(56) References Cited

U.S. PATENT DOCUMENTS

| 2011/0190456 | A1  | 8/2011  | Itoh et al.         |
| 2017/0234103 | A1* | 8/2017  | Frazier ............... E21B 33/1291 166/138 |
| 2017/0306144 | A1* | 10/2017 | Kobayashi ............. C08L 23/08 |
| 2018/0079901 | A1* | 3/2018  | Yun ........................ C09K 8/426 |
| 2018/0094132 | A1  | 4/2018  | Kobayashi et al.    |

FOREIGN PATENT DOCUMENTS

| WO | 20180094132 A | 4/2008 |
| WO | 20110190456 A | 8/2011 |
| WO | 20170306144 A | 10/2017 |

OTHER PUBLICATIONS

International search report and written opinion mailed Apr. 9, 2024 for PCT/US23/78761.

* cited by examiner

Primary Examiner — William D Hutton, Jr.
Assistant Examiner — Avi T Skaist
(74) Attorney, Agent, or Firm — Frank Gao, Esq.

(57) ABSTRACT

The patent application discloses a degradable downhole tool member for hydrocarbon resource recovery. The downhole tool member comprises a shaped body comprising a degradable polymer matrix, wherein the downhole tool member, when held in downhole fluid at about 80° C., has an initial mass loss about 14% for a holding period of about 2 days in a pressure holding test.

18 Claims, 3 Drawing Sheets

MOLDED ARTICLES OF MODIFIED POLYGLYCOLIC ACID FOR DEGRADABLE DOWNHOLE TOOLS APPLICATION

TECHNICAL FIELD

The invention disclosure relates to polyglycolic acid resin compound containing polylactic acid, and compatibilizer, and molded articles therefrom. More particularly, the present invention relates to a technique regarding biodegradable polymer compounds of modified polyglycolic acid and molded articles for degradable downhole tools application.

BACKGROUND

Degradable materials have many uses in our society, ranging from making degradable plastic bags, diapers, and water bottles, to making degradable excipients for pharmaceutical delivery and degradable implants for surgical use, to a wide variety of industrial uses, such as in soil remediation, agriculture, and oil and gas production.

For example, degradable materials have been used for fluid loss control, for diversion, and as temporary plugs in downhole applications of oil and gas production.

Examples of degradable materials that have been used in oil-well downhole include rock salt, benzoic acid flakes, wax beads, wax buttons, oil-soluble resin materials, and the like. In addition to filling and blocking fractures and permeable zones right in the reservoir, degradable materials have also been used to form consolidated plugs in wellbores that degrade after use, eliminating the need for retrieval.

New materials that can be used in such applications are always needed, and in particular materials that quickly degrade under downhole conditions are particularly needed.

SUMMARY

In one aspect, one embodiment discloses a downhole tool member for hydrocarbon resource recovery. The downhole tool member comprises a shaped body comprising a degradable polymer matrix. The downhole tool member, when held in downhole fluid at 80° C., has an initial mass loss about 14% for a holding period of 2 days in a pressure holding test.

Optionally in any aspect, the mass loss is about 50% for a holding period of 7 days in the pressure holding test.

Optionally in any aspect, the degradable polymer comprises polyglycolic acid resin.

Optionally in any aspect, the polymer comprises polylactic acid.

Optionally in any aspect, the downhole tool member holds pressure ranging from 6500 psi to 10000 psi at 93° C. for up to 24 hours in the pressure holding test.

Optionally in any aspect, the downhole fluid comprises KCl solution.

Optionally in any aspect, the polymer comprises a copolymer of two or more aliphatic polyesters copolymer comprises poly(lactic acid-co-glycolic acid) (PLGA). Optionally in one aspect, the copolymer comprises poly(lactic acid-co-glycolic acid) (PLGA).

Optionally in any aspects, the copolymer comprises poly(lactic acid-co-glycolic acid) (PLGA).

Optionally in any aspects, the copolymer poly(lactic acid-co-glycolic acid) (PLGA) ranges from about 0 part to about 6 parts (considering polyglycolic acid (PGA) and polylactic acid (PLA) as 100 parts, where PLA ranges from about 1 part to about 30 parts.

Further in another aspect, one embodiment discloses a downhole tool member for hydrocarbon resource recovery. The downhole tool member comprises a shaped body comprising a degradable polymer matrix. The downhole tool member, when held in downhole fluid at 80° C., has a mass loss about 50% for a holding period of 7 days in a pressure holding test.

Optionally in any aspects, the downhole tool member, when held in downhole fluid: at 80° C., has an initial mass loss about 14% for a holding period of 2 days in the pressure holding test.

Optionally in any aspects, the polymer comprises polyglycolic acid resin.

Optionally in any aspects, the polymer comprises a copolymer of two or more aliphatic polyesters.

Optionally in any aspects, the copolymer comprises poly(lactic acid-co-glycolic acid) (PLGA).

Optionally in any aspects, the downhole tool member holds pressure ranging from 6500 psi to 10000 psi at 93° C. for up to 24 hours in a pressure holding test.

In yet another aspect, one embodiment discloses a downhole tool member for hydrocarbon resource recovery. The downhole tool may comprise a shaped body comprising a degradable polymer matrix. The downhole tool member has hold pressure ranging from 6500 psi to 10000 psi at 93° C. for up to 24 hours in a pressure holding test.

Optionally in any aspect, the polymer comprises copolymer, wherein the copolymer comprises poly(lactic acid-co-glycolic acid) (PLGA).

Optionally in any aspect, the downhole tool member, when held in downhole fluid: at 80° C., has an initial mass loss about 14% for a holding period of 2 days in the pressure holding test.

Optionally in any aspect, the downhole tool member, when held in downhole fluid: at 80° C., has a mass loss about 50% for a holding period of 7 days in the pressure holding test.

BRIEF DESCRIPTION OF THE DRAWINGS

In order to illustrate the technical solutions more clearly in the embodiments of the present disclosure or the exemplary techniques, the drawings to be used in the embodiments or the description of the exemplary embodiments will be briefly described below. Obviously, the drawings in the following description are only certain embodiments of the present disclosure, and other drawings may be obtained according to the structures shown in the drawings without any creative work for those skilled in the art.

Figure 1A:
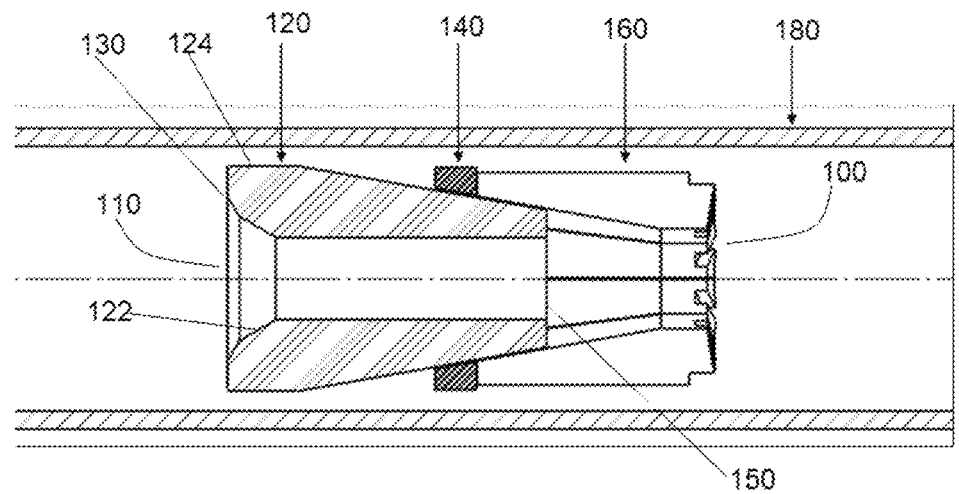
FIG. 1A shows a schematic view illustrating a specific example of a designed dissolvable plug.
Figure 1B:
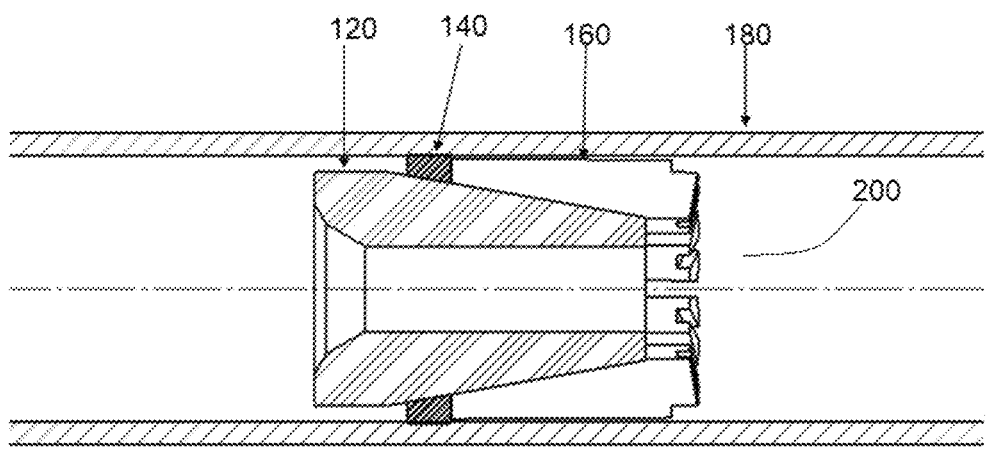
FIG. 1B is a schematic view illustrating a setting state in which the circular rubber sealing element of the designed dissolvable plug (with degradable modified PGA mandrel cone) for well drilling process of FIG. 1A has expanded in diameter for sealing.

The implementation, functional features and advantages of the present disclosure will be further described with reference to the accompanying drawings.

DETAILED EMBODIMENTS

Definitions

The term "about" means plus or minus 20%, more preferably plus or minus 10%, even more preferably plus or minus 5%, most preferably plus or minus 2%.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All percentages for weights expressed herein are by weight of the total food product unless specifically stated otherwise.

The technical means, creative features, objectives, and effects of the patent application may be easy to understand, the following embodiments will further illustrate the patent application. However, the following embodiments are only the preferred embodiments of the utility patent application, not all of them. Based on the examples in the implementation manners, other examples obtained by those skilled in the art without creative work shall fall within the protection scope of the present invention. The experimental methods in the following examples are conventional methods unless otherwise specified. The materials and reagents used in the following examples can be obtained from commercial sources unless otherwise specified.

The Inventions

The downhole tool member described herein may have some millable parts and some dissolvable parts for longer term life. The dissolvable parts of the downhole tool member may be made of or comprise a degradable or dissolvable material. The terms "degradable" and "dissolvable" will be used herein interchangeably. The term "degradable" and all of its grammatical variants (e.g., "degrade," "degradation," "degrading," and the like) refers to the dissolution or chemical conversion of materials into smaller components, intermediates, or end products by at least one of solubilization, hydrolytic degradation, biologically formed entities (e.g., bacteria or enzymes), chemical reactions (including electrochemical reactions), thermal reactions, or reactions induced by radiation. In some instances, the degradation of the material may be sufficient for the mechanical properties of the material to be reduced to a point that the material no longer maintains its integrity and, in essence, falls apart or sloughs off. The conditions for degradation or dissolution are generally wellbore conditions where an external stimulus may be used to initiate or effect the rate of degradation. For example, the pH of the fluid that interacts with the material may be changed by the introduction of an acid or a base.

The degradation rate of a given dissolvable material may be accelerated, rapid, or normal, as defined herein. Accelerated degradation may be in the range of from a lower limit of about 30 minutes, 1 hour, 2 hours, 3 hours, 4 hours, 5 hours, and 6 hours to an upper limit of about 12 hours, 11 hours, 10 hours, 9 hours, 8 hours, 7 hours, and 6 hours, encompassing any value or subset therebetween. Rapid degradation may be in the range of from a lower limit of about 12 hours, 1 day, 2 days, 3 days, 4 days, and 5 days to an upper limit of about 10 days, 9 days, 8 days, 7 days, 6 days, and 5 days, encompassing any value or subset therebetween. Normal degradation may be in the range of from a lower limit of about 10 days, 11 days, 12 days, 13 days, 14 days, 15 days, 16 days, 17 days, 18 days, 19 days, 20 days, 21 days, 22 days, 23 days, 24 days, 25 days, and 26 days to an upper limit of about 40 days, 39 days, 38 days, 37 days, 36 days, 35 days, 34 days, 33 days, 32 days, 31 days, 30 days, 29 days, 28 days, 27 days, and 26 days, encompassing any value or subset therebetween. Accordingly, degradation of the dissolvable material may be between about 30 minutes to about 40 days, depending on a number of factors including, but not limited to, the type of dissolvable material selected, the conditions of the wellbore environment, and the like.

Suitable dissolvable materials that may be used in accordance with the embodiments of the present disclosure include dissolvable metals, galvanically-corrodible metals, degradable polymers, a degradable rubber, borate glass, polyglycolic acid (PGA), polylactic acid (PLA), dehydrated salts, and any combination thereof. Suitable dissolvable materials may also include an epoxy resin exposed to a caustic solution, fiberglass exposed to an acid, aluminum exposed to an acidic fluid, and a binding agent exposed to a caustic or acidic solution. The dissolvable materials may be configured to degrade by a number of mechanisms including, but not limited to, swelling, dissolving, undergoing a chemical change, electrochemical reactions, undergoing thermal degradation, or any combination of the foregoing.

Degradation by swelling involves the absorption by the dissolvable material of aqueous or hydrocarbon fluids present within the wellbore environment such that the mechanical properties of the dissolvable material degrade or fail. In degradation by swelling, the dissolvable material continues to absorb the aqueous and/or hydrocarbon fluid until its mechanical properties are no longer capable of maintaining the integrity of the dissolvable material and it at least partially falls apart. In some embodiments, the dissolvable material may be designed to only partially degrade by swelling in order to ensure that the mechanical properties of the component formed from the dissolvable material is sufficiently capable of lasting for the duration of the specific operation in which it is utilized.

Exemplary aqueous fluids that may be used to swell and degrade the dissolvable material include, but are not limited to, fresh water, saltwater (e.g., water containing one or more salts dissolved therein), brine (e.g., saturated salt water), seawater, acid, bases, or combinations thereof. Example hydrocarbon fluids that may swell and degrade the dissolvable material include, but are not limited to, crude oil, a fractional distillate of crude oil, a saturated hydrocarbon, an unsaturated hydrocarbon, a branched hydrocarbon, a cyclic hydrocarbon, and any combination thereof.

Degradation by dissolving involves a dissolvable material that is soluble or otherwise susceptible to an aqueous fluid or a hydrocarbon fluid, such that the aqueous or hydrocarbon fluid is not necessarily incorporated into the dissolvable material (as is the case with degradation by swelling), but becomes soluble upon contact with the aqueous or hydrocarbon fluid.

Degradation by undergoing a chemical change may involve breaking the bonds of the backbone of the dissolvable material (e.g., a polymer backbone) or causing the bonds of the dissolvable material to crosslink, such that the dissolvable material becomes brittle and breaks into small pieces upon contact with even small forces expected in the wellbore environment.

Thermal degradation of the dissolvable material involves a chemical decomposition due to heat, such as heat that may be present in a wellbore environment. Thermal degradation of some dissolvable materials mentioned or contemplated herein may occur at wellbore environment temperatures that exceed about 93° C. (or about 200° F.). More specifically, this PGA based dissolvable plug might be readily used in the wide temperature ranges from about 80° C. to about 120° C., might be even from about 70° C. to about 130° C., and even from about 60° C. to about 140° C. range.

With respect to dissolvable or galvanically-corrodible metals used as a dissolvable material, the metal may be configured to degrade by dissolution in the presence of an aqueous fluid or via an electrochemical process in which a galvanically-corrodible metal corrodes in the presence of an electrolyte (e.g., brine or other salt-containing fluids). Suitable dissolvable or galvanically-corrodible metals include, but are not limited to, gold, gold-platinum alloys, silver, nickel, nickel-copper alloys, nickel-chromium alloys, copper, copper alloys (e.g., brass, bronze, etc.), chromium, tin, aluminum, iron, zinc, magnesium, and beryllium. Suitable galvanically-corrodible metals also include a nano-structured matrix galvanic materials. One example of a nano-structured matrix micro-galvanic material is a magnesium alloy with iron-coated inclusions. Suitable galvanically-corrodible metals also include micro-galvanic metals or materials, such as a solution-structured galvanic material. An example of a solution-structured galvanic material is zirconium (Zr) containing a magnesium (Mg) alloy, where different domains within the alloy contain different percentages of Zr. This leads to a galvanic coupling between these different domains, which causes micro-galvanic corrosion and degradation. Micro-galvanically corrodible magnesium alloys could also be solution structured with other elements such as zinc, aluminum, nickel, iron, carbon, tin, silver, copper, titanium, rare earth elements, et cetera. Micro-galvanically corrodible aluminum alloys could be in solution with elements such as nickel, iron, carbon, tin, silver, copper, titanium, gallium, et cetera. Of these galvanically-corrodible metals, magnesium and magnesium alloys may be preferred.

With respect to degradable polymers used as a dissolvable material, a polymer is considered "degradable" or "dissolvable" if the degradation is due to, in situ, a chemical and/or radical process such as hydrolysis, oxidation, or UV radiation. Degradable polymers, which may be either natural or synthetic polymers, include, but are not limited to, polyacrylics, polyamides, and polyolefins such as polyethylene, polypropylene, polyisobutylene, and polystyrene. Suitable examples of degradable polymers that may be used in accordance with the embodiments of the present invention include polysaccharides such as dextran or cellulose, chitins, chitosans, proteins, aliphatic polyesters, poly(lactides), poly (glycolides), poly(s-caprolactones), poly(hydroxybutyrates), poly(anhydrides), aliphatic or aromatic polycarbonates, poly(orthoesters), poly(amino acids), poly(ethylene oxides), polyphosphazenes, poly(phenyllactides), poly-epichlorohydrins, copolymers of ethyleneoxide/poly-epichlorohydrin, terpolymers of epichlorohydrin/ethylene oxide/allyl glycidyl ether, and any combination thereof.

Polyanhydrides are another type of particularly suitable degradable polymer useful in the embodiments of the present disclosure. Polyanhydrides hydrolyze in the presence of aqueous fluids to liberate the constituent monomers or comonomers, yielding carboxylic acids as the final degradation products. The erosion time can be varied over a broad range of changes to the polymer backbone, including varying the molecular weight, composition, or derivatization. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

Suitable degradable rubbers include degradable natural rubbers (i.e., cis-1,4-polyisoprene) and degradable synthetic rubbers, which may include, but are not limited to, ethylene propylene diene M-class rubber, isoprene rubber, isobutylene rubber, polyisobutene rubber, styrene-butadiene rubber, silicone rubber, ethylene propylene rubber, butyl rubber, norbornene rubber, polynorbornene rubber, a block polymer of styrene, a block polymer of styrene and butadiene, a block polymer of styrene and isoprene, and any combination thereof. Other suitable degradable polymers include those that have a melting point that is such that it will dissolve at the temperature of the subterranean formation in which it is placed.

In some embodiments, the dissolvable material may have a thermoplastic polymer embedded therein. The thermoplastic polymer may modify the strength, resiliency, or modulus of the component and may also control the degradation rate of the component. Suitable thermoplastic polymers may include, but are not limited to, an acrylate (e.g., polymethylmethacrylate, polyoxymethylene, a polyamide, a polyolefin, an aliphatic polyamide, polybutylene terephthalate, polyethylene terephthalate, polycarbonate, polyester, polyethylene, polyetheretherketone, polypropylene, polystyrene, polyvinylidene chloride, styrene-acrylonitrile), polyurethane prepolymer, polystyrene, poly(o-methylstyrene), poly (m-methylstyrene), poly(p-methylstyrene), poly(2,4-dimethylstyrene), poly(2,5-dimethylstyrene), poly(p-tert-butylstyrene), poly(p-chlorostyrene), poly(a-methylstyrene), co- and ter-polymers of polystyrene, acrylic resin, cellulosic resin, polyvinyl toluene, and any combination thereof. Each of the foregoing may further comprise acrylonitrile, vinyl toluene, or methyl methacrylate. The amount of thermoplastic polymer that may be embedded in the dissolvable material forming the component may be any amount that confers a desirable elasticity without affecting the desired amount of degradation. In some embodiments, the thermoplastic polymer may be included in an amount in the range of a lower limit of about 1%, 5%, 10%, 15%, 20%, 25%, 30%, 35%, 40%, and 45% to an upper limit of about 91%, 85%, 80%, 75%, 70%, 65%, 60%, 55%, 50%, and 45% by weight of the dissolvable material, encompassing any value or subset therebetween.

This exemplary embodiment is about a molded article for the degradable downhole tool application. The molded modified polyglycolic acid as mandrel cone of degradable plug for downhole application, where the mandrel cone is critical member of the degradable plug. The mandrel cone made of modified polyglycolic acid can withstand pressure up to 8750 psi at 90° C. in the pressure holding test. The mandrel cone made of modified polyglycolic acid had mass loss 14% after 2 days in the aqueous solution at 80° C., furthermore, had mass loss about 50% after 7 days in the aqueous solution at 80° C. in the pressure holding test.

As polyglycolic acid (PGA) possesses chemical resistance, high mechanical strength, high temperature performance, and hydrolytic degradable in the downhole environment. But the shortcoming is that PGA is not impact resistant, and has large shrinkage for the large, molded parts targeting to the downhole tool application.

Here, the PGA may be modified with blending other degradable polymers, including PLA, PLGA. These modifications are intending to reduce the molding shrinkage, also reduce the brittleness. For the blend of PGA/PLA with small amount of PLGA, the PLGA (is a copolymer P (LA-co-GA)) is acting as compatibilizer between PGA and PLA, and making the minor PLA component well dispersed and with very small domain size within the PGA matrix via increasing the interfacial bonding between PGA and PLA phases. Due to the well-dispersion and minor component of PLA, PLA has a minimum effect on the degradation of PGA, so the PLA will reduce or delay the degradation rate of PGA and also increase the impact resistance and elongation of PGA.
Polyglycolic Acid (PGA) Resin The biodegradable PGA is an aliphatic polyester, which is biodegraded with enzyme, etc. The PGA also tends to a hydrolytic degradation in water, aqueous solution or moisture environment. The PGA contained in the PGA composition of the present invention refers not only to homopolymers of glycolic acid consisting of repeating units of glycolic acid represented by the formula: (—O—$CH_2$— CO—) (including ring-opened polymers of glycolides as bimolecular cyclic esters of glycolic acid), but also to polyglycolic acid copolymers (PGA copolymers) containing at least 70 mass % of the repeating units of glycolic acid described above. A PGA can be synthesized by dehydrative polycondensation of a glycolic acid serving as an α-hydroxycarboxylic acid. In order to efficiently synthesize a high-molecular weight PGA, synthesis is done by performing ring-opening polymerization on a glycolide, which is a bimolecular cyclic ester of glycolic acid.

Examples of comonomers for providing a PGA copolymer together with the aforementioned glycolic acid monomers such as glycolides include glycol compounds such as ethylene glycol, propylene glycol, butanediol, heptanediol, hexanediol, octanediol, nonanediol, decanediol, 1,4-cyclohexane dimethanol, neopentyl glycol, glycerin, pentaerythritol, bisphenol A, polyethylene glycol, polypropylene glycol, and polytetramethylene glycol; dicarboxylic acids such as oxalic acid, adipic acid, sebacic acid, azelaic acid, dodecanedioic acid, malonic acid glutaric acid, cyclohexane dicarboxylic acid, terephthalic acid, isophthalic acid, phthalic acid, naphthalene dicarboxylic acid, bis(p-carboxyphenyl) methane, anthracene dicarboxylic acid, 4,4'-diphenyl ether dicarboxylic acid, 5-sodium sulfoisophthalic acid, and 5-tetrabutyl phosphonium isophthalic acid; hydroxycarboxylic acids such as lactic acid, hydroxypropionic acid, hydroxybutyric acid, hydroxyvaleric acid, hydroxycaproic acid, and hydroxybenzoic acid; lactides; lactones such as caprolactone, valerolactone, propiolactone, undecalactone, and 1,5-oxepan-2-one; carbonates such as trimethylene carbonate; essentially equimolar mixtures of aliphatic diols such as ethylene glycol and 1,4-butanediol and aliphatic dicarboxylic acids such as succinic acid and adipic acid or alkyl esters thereof; or two or more types thereof. Polymers of these comonomers can be used as starting raw materials for providing a PGA copolymer together with glycolic acid monomers such as the glycolides described above. A preferable comonomer is lactic acid, which results in the formation of a copolymer of glycolic acid and lactic acid (PGLA).

The repeating units of glycolic acid in the PGA of the PGA composition of the present invention form essentially from a PGA homopolymer having at least 70 mass %, preferably at least 80 mass %, more preferably at least 90 mass %, even more preferably at least 95 mass %, particularly preferably at least 98 mass % of the repeating units of glycolic acid, and sometimes 100 mass % of the repeating units of glycolic acid. When the ratio of repeating units of glycolic acid is too small, the expected hydrolyzability, heat resistance, mechanical characteristics, and the like of the PGA composition of the present invention become poor. Repeating units other than the glycolic acid repeating units are used at a ratio of at most 30 mass %, preferably at most 20 mass %, more preferably at most 10 mass %, even more preferably at most 5 mass %, particularly preferably at most 2 mass %, and most preferably at most 1 mass %; and no repeating units other than glycolic acid repeating units may also be used.

In order to efficiently produce the desired high-molecular weight polymer, the PGA in the PGA composition of the present invention is preferably a PGA obtained by polymerizing from 70 to 100 mass % of a glycolide and from 30 to 0 mass % of another comonomer described above. The other comonomer may be a bimolecular cyclic monomer or a mixture of both rather than a cyclic monomer, but in order to obtain the targeted PGA composition of the present invention, a cyclic monomer is preferable. A PGA obtained by performing ring-opening polymerization on from 70 to 100 mass % of a glycolide and from 30 to 0 mass % of another cyclic monomer will be described in detail hereinafter.
Glycolide A glycolide for forming a PGA by ring-opening polymerization is a bimolecular cyclic ester of glycolic acid. The production method of a glycolide is not particularly limited, but a glycolide can typically be obtained by the thermal depolymerization of a glycolic acid oligomer. Examples of methods that can be used as a glycolic acid oligomer depolymerization method include a melt depolymerization method, a solid phase depolymerization method, and a solution depolymerization method, and a glycolide obtained as a cyclic condensate of a chloroacetic acid salt may also be used. In addition, a glycolide containing glycolic acid with a maximum glycolide content of 20 mass % may be used.

The PGA in the PGA composition of the present invention may be formed by performing ring-opening polymerization on a glycolide alone, but a copolymer may also be formed by simultaneously performing ring-opening polymerization on another cyclic monomer as a copolymer component. When a copolymer is formed, a glycolide ratio of the copolymer is at least 70 mass %, preferably at least 80 mass %, more preferably at least 95 mass %, even more preferably at least 95 mass %, particularly preferably at least 98 mass %, and most preferably at least 99 mass % which is essentially a PGA homopolymer.
Other Cyclic Monomer Other cyclic monomers that can be used as components to be copolymerized with the glycolide include bimolecular cyclic esters of hydroxycarboxylic acid such as lactides as well as cyclic monomers such as lactones (for example, beta-propiolactone, beta-butyrolactone, pivalolactone, gamma-butyrolactone, δ-Valerolactone, Beta-methyl-δ-valerolactone, 6-caprolactone, and, trimethylene carbonate, 1,3-dioxane (dioxan). A preferable other cyclic monomer is another bimolecular cyclic ester of hydroxycarboxylic acid, examples of which include L-lactic acid, D-lactic acid, alpha-hydroxybutyric acid, alpha-hydroxyisobutyric acid, alpha-hydroxyvaleric acid, alpha-hydroxycaproic acid, alpha-hydroxyisocaproic acid, alpha-hydroxyheptanoic acid, alpha-hydroxyoctanoic acid, alpha-hydroxydecanoic acid, alpha-hydroxymyristic acid, alpha-hydroxystearic acid, and alkyl-substituted products thereof. A particularly preferable other cyclic monomer is a lactide which is a bimolecular cyclic ester of lactic acid, and this may be an L-form, a D-form, a racemic form, or a mixture thereof.

The ratio of the other cyclic monomer is at most 30 mass %, preferably at most 20 mass %, more preferably at most 10 mass %, even more preferably at most 5 mass %, particularly preferably at most 2 mass %, and most preferably at most 1 mass %. When the PGA is formed from 100 mass % of a glycolide, the ratio of the other cyclic monomer is 0 mass %, and such a PGA is also included in the scope of the present invention. By performing ring-opening copolymerization on a glycolide and another cyclic monomer, it is possible to improve the molding workability by reducing the melting point (Tm, sometimes called the "crystal melting point") of the PGA copolymer, reducing the processing temperature for producing a product such as a molded product from the PGA composition, or controlling the crystallization speed. However, when the ratio of the cyclic monomers that are used is too high, the crystallinity of the PGA copolymer that is formed is diminished, and the heat resistance, mechanical characteristics, and the like are reduced.

Ring-Opening Polymerization Reaction

The ring-opening polymerization or ring-opening copolymerization of a glycolide (collectively called "ring-opening (co) polymerization" hereafter) is preferably performed in the presence of a small amount of a catalyst. The catalyst is not particularly limited, but examples include tin compounds such as tin halides (for example, tin dichloride, tin tetrachloride, and the like), organic tin carboxylates (for example, tin octanoates such as tin 2-ethylhexanoate); titanium compounds such as alkoxytitanate; aluminum compounds such as alkoxyaluminum; zirconium compounds such as zirconium acetyl acetone; and antimony compounds such as antimony halide and antimony oxide. The amount of the catalyst that is used is preferably approximately from 1 to 1,000 ppm and more preferably approximately from 3 to 300 ppm in terms of mass ratio relative to the cyclic ester.

In the ring-opening (co) polymerization of the glycolide, a protic compound such as an alcohol (which may be a higher alcohol such as lauryl alcohol) or water may be used as a molecular weight adjusting agent in order to control physical properties such as the melt viscosity or molecular weight of the produced PGA. In addition, a glycolide typically contains a minute amount of water and hydroxycarboxylic acid compounds such as glycolic acids or straight-chain glycolic acid oligomers as impurities, and these compounds also act on the polymerization reaction. Therefore, the molecular weight of the product PGA can be adjusted by quantitating the concentration of these impurities as a molar concentration by means of the neutralization titration of carboxylic acid, for example, and adding an alcohol or water as a protic compound in accordance with the target molecular weight so as to control the molar concentration of the entire protic compound with respect to the glycolide. In addition, a polyhydric alcohol such as glycerin may be added to improve the physical properties.

The ring-opening (co) polymerization of the glycolide may be bulk polymerization or solution polymerization, but bulk polymerization is used in many cases. A polymerization apparatus for bulk polymerization may be selected appropriately from various apparatuses such as an extruder type, a vertical type having paddle wings, a vertical type having helical ribbon wings, an extruder or kneader horizontal type, an ampoule type, a plate type, or a tube type apparatus. In addition, various reaction vessels may be used for solution polymerization.

The polymerization temperature can be set appropriately in accordance with the intended purpose in a range of 120° C. to 300° C., which is essentially the polymerization initialization temperature. The polymerization temperature is preferably from 130 to 270° C., more preferably from 140 to 260° C., and particularly preferably from 150 to 250° C. When the polymerization temperature is too low, the molecular weight distribution of the produced PGA tends to become wide. When the polymerization temperature is too high, the produced PGA tends to be subjected to thermal decomposition. The polymerization time is in a range of 3 minutes to 50 hours and preferably from 5 minutes to 30 hours. When the polymerization time is too short, it is difficult for polymerization to progress sufficiently, which makes it impossible to realize the prescribed weight average molecular weight. When the polymerization time is too long, the produced PGA tends to be colored.

After the produced PGA is converted to a solid state, solid phase polymerization may be further performed as desired. Solid phase polymerization refers to the operation of performing heat treatment while maintaining a solid state by heating at a temperature less than the melting point of the PGA. As a result of this solid phase polymerization, low-molecular-weight components such as unreacted monomers or oligomers are volatilized and removed. Solid phase polymerization is preferably performed for from 1 to 100 hours, more preferably from 2 to 50 hours, and particularly preferably from 3 to 30 hours.

(Weight Average Molecular Weight (Mw))

The weight average molecular weight (Mw) of the PGA contained in the PGA composition of the present invention is typically preferably in a range of from 70,000 to 1,000,000, more preferably in a range of from 100,000 to 800,000, even more preferably in a range of from 120,000 to 500,000, and particularly preferably in a range of from 150,000 to 400,000. The weight average molecular weight (Mw) of the PGA is determined by a gel permeation chromatography (GPC) apparatus. When the weight average molecular weight (Mw) is too low, degradation progresses quickly, which may make it difficult to achieve the purpose of the present invention, or the heat resistance or the mechanical characteristics such as strength may be insufficient. When the weight average molecular weight (Mw) is too high, it may become difficult to produce the PGA composition, or the hydrolyzability or degradability may be insufficient.

Molecular Weight Distribution (Mw/Mn)

Setting the molecular weight distribution (Mw/Mn), which is expressed as the ratio (Mw/Mn) of the weight average molecular weight (Mw) to the number average molecular weight (Mn) of the PGA contained in the PGA composition of the present invention, to in a range of 1.5 to 4.0 is preferable in that the degradation rate can be controlled by reducing the amount of polymer components in the low-molecular-weight range susceptible to degradation at an early stage or polymer components in the high-molecular-weight range with fast degradation. When the molecular weight distribution (Mw/Mn) is too broad, the degradation rate is no longer dependent on the weight average molecular weight (Mw) of the PGA, which may make it difficult to control degradation. When the molecular weight distribution (Mw/Mn) is too narrow, it may be difficult to maintain the mechanical characteristics such as the strength of the PGA composition for a prescribed period of time. The molecular weight distribution (Mw/Mn) is preferably from 1.6 to 3.7 and more preferably from 1.65 to 3.5. As in the case of the weight average molecular weight (Mw), the molecular weight distribution (Mw/Mn) is determined using a GPC analysis apparatus.

Melting Point (Tm)

The melting point (Tm) of the PGA contained in the PGA composition of the present invention is typically from 180 to 245° C. and can be adjusted based on the weight average molecular weight (Mw), the types and content ratios of copolymerization components, and the like. The melting point (Tm) of the PGA is preferably from 190 to 240° C., more preferably from 195 to 235° C., and particularly preferably from 200 to 230° C. The melting point (Tm) of a homopolymer of the PGA is typically approximately 220° C. When the melting point (Tm) is too low, the heat resistance or the mechanical characteristics such as strength may be insufficient. When the melting point (Tm) is too high, the workability of the PGA composition may be insufficient, or it may not be possible to sufficiently control the formation of the product, which may prevent characteristics such as the hydrolyzability or biodegradability from falling within the desired ranges. The melting point (Tm) of the PGA is determined in a nitrogen atmosphere using a differential scanning calorimeter (DSC).

Glass Transition Temperature (Tg)

The glass transition temperature (Tg) of the PGA contained in the PGA composition of the present invention is typically from 25 to 60° C., preferably from 30 to 55° C., more preferably from 32 to 52° C., and particularly preferably from 35 to 50° C. The glass transition temperature (Tg) of the PGA can be adjusted by the weight average molecular weight (Mw), the molecular weight distribution, the types and content ratios of the copolymer components, and the like. The glass transition temperature (Tg) of the PGA is determined in a nitrogen atmosphere using a differential scanning calorimeter (DSC).

Melt Flow Rate (MFR)

The melt flow rate (MFR) of the PGA contained in the PGA composition of the present invention is ordinarily preferably within a range of from 0.1 to 100 g/10 min, more preferably within a range of from 1 to 50 g/10 min, and even more preferably within a range of from 2 to 20 g/10 min. The MFR of the PGA is expressed as the amount of fluid flow (g) per 10 minutes measured at a temperature of 240° C. under a load of 2.16 kg. When the MFR of the PGA is too high, it may not be possible to secure molding workability depending on the production process, or the mechanical characteristics such as the strength of a product obtained from the PGA composition may be insufficient, which may prevent a PGA composition having the desired characteristics from being obtained. When the MFR of the PGA is too low, it may become difficult to mold the resulting PGA composition.

Other Resins or Additives

The PGA composition of the present invention may further contain other biodegradable resins, other resins, or other additives as long as they do not conflict with the purpose of the present invention.

Other Biodegradable Resins

Examples of other biodegradable resins that may be further contained in the PGA composition of the present invention include polyhydroxyalkanoates such as polyhydroxybutylate, polyhydroxyvalerate, polyhydroxycaproate, polyhydroxyheptanoate, and poly(hydroxybutylate/hydroxyvalerate); polyesters formed from dicarboxylic acids and diols such as polyethylene succinate, polybutylene succinate, and polybutylene succinate adipate; polyether esters such as polydioxanone; aliphatic polycarbonates such as polytrimethylene carbonate; polyamino acids such as poly-alpha-pyrrolidone, polyasparagine, and polylysine; and copolymers or mixtures thereof, but PLA is preferable. When the PGA composition of the present invention contains another biodegradable resin, it is possible to adjust the degradability—that is, the hydrolyzability or biodegradability, the workability or the mechanical characteristics such as strength.

When the PGA composition of the present invention contains a PGA and another biodegradable resin, the ratio PGA is preferably at least 70 parts by mass, more preferably at least 80 parts by mass, even more preferably 90 parts by mass, and particularly preferably at least 95 parts by mass when the total of the PGA and the other biodegradable resin is defined as 100 parts by mass.

Other Resins

Examples of other resins that may be further contained in the PGA composition of the present invention include polyolefin resins such as polyethylene and polypropylene; polyamide resins such as poly-L-lysine; acrylic resins; polyethers such as polyethylene glycol and polypropylene glycol; denatured polyvinyl alcohol; soft polyolefin resins such as ethylene/glycidyl methacrylate copolymers, ethylene/propylene terpolymers, and ethylene/butylene homopolymers; styrene copolymer resins; polyphenylene sulfide resins; polyether ether ketone resins; polyester resins such as polyethylene terephthalate and polybutylene terephthalate; polyacetal resins; polysulfone resins; polyphenylene ether resins; polyimide resins; polyether imide resins; cellulose esters; polyurethane resins; phenol resins; melamine resins; unsaturated polyester resins; silicone resins; and epoxy resins. Two or more types of these other resins may also be mixed and contained in the composition. The workability or the mechanical properties such as strength of the PGA composition of the present invention can be adjusted by further containing other resins together with another biodegradable resin or without containing another biodegradable resin. When the PGA composition contains the other resins, the content of the other resins is ordinarily at most 30 parts by mass, preferably at most 20 parts by mass, and more preferably at most 10 parts by mass per 100 parts by mass of the PGA, and the content may also be 5 parts by mass or lower or 1 part by mass or lower.

PLA

Polylactic acid or polylactide (PLA) is a thermoplastic aliphatic polyester often derived from renewable resources. Polylactic acid is considered biodegradable under certain conditions and may be degraded through a hydrolysis reaction. Generally speaking, amorphous polylactic acid degrades more readily than crystalline polylactic acid, which is generally a purer form of poly-D-lactide or poly-L-lactide.

D-lactide is a dilactone, or cyclic dimer, of D-lactic acid. Similarly, L-lactide is a cyclic dimer of L-lactic acid. Meso D,L-lactide is a cyclic dimer of D-, and L-lactic acid. Racemic D,L-lactide comprises a 50/50 mixture of D-, and L-lactide. When used alone herein, the term "D,L-lactide" is intended to include meso D,L-lactide or racemic D,L-lactide. Poly(lactic acid) may be prepared from one or more of the above. The chirality of the lactide units provides a means to adjust degradation rates as well as physical and mechanical properties. Poly(L-lactide), for instance, is a semicrystalline polymer with a relatively slow hydrolysis rate. Poly (D,L-lactide) is an amorphous polymer with a faster hydrolysis rate. The stereoisomers of lactic acid may be used individually combined or copolymerized in accordance with the present invention.

During the degradation of polylactic acid, an acid is generated which can then dissolve or react with downhole materials including, but not limited to, acid soluble bridging agents (calcium carbonate), polymers such as pH reversible gels, and shrinkable clays.

In some embodiments, the amorphous polylactic acid may be particles, rods, fibers, flakes, or a thin film.

Compatibilizer

A blend is a physical mixture of two or more components which typically offers a compromise of properties and economies of the individual components. It is well known that the nature and properties of the interface of components in a blend frequently exert a limiting effect on the bulk properties of a multi-phase blend material. In fact, the physical and mechanical properties of a blend are very often inferior to the mathematical average of the properties of the original components. Blend components can be miscible or immiscible in their behavior toward each other.

Alloys are different from blends. Although they are also composed of two or more components, alloys exhibit strong intermolecular forces wherein intermolecular bonding between the components of the blend is provided by compatibilizers. This bonding in turn, creates new properties different from those of the original components and often exceeding those of the average of the original ingredients. The types of interaction or "chemical bonding" between the components can include, for example, one or more of the following mechanisms: ionic; covalent; molecular interpenetration; hydrogen bonding; or associative.

Successful compatibilization by one or more of these interactions gives rise to interfacial adhesion to provide the formation of cohesive multi-phase compatibilized alloys with useful properties. To achieve compatibilization a number of strategies have emerged. In one approach, suitable block or graft copolymers are introduced to serve as macromolecular emulsifiers providing covalent bonds that traverse and fortify the blend interface. Block and graft copolymers may be generated in-situ through reactive extrusion and blending to generate a compatibilized blend.

In another approach, polymers having nucleophilic functional groups are interacted with compatibilizers containing hydrogen to form hydrogen bonding. Ionomers have also served as compatibilizers. In some cases, ionic or strong physicochemical interactions are generated across the interface, which in turn enhances compatibilization.

Compatibilization can also result from the addition of a similar functional group using the "like attract like" theory, such as the use of chlorinated polyethylene to compatibilizer polyvinyl chloride with polyethylene. This has been referred to as "associative" bonding. Finally, compatibilization has even been demonstrated by the addition of a third immiscible phase component that exhibits relatively low interfacial tension with each of the primary blend components, i.e., those components intended to be compatibilized. The compatibilizing effects of the mutually miscible component may result from its presumed tendency to become enriched in the vicinity of the blend interface.

Alloying provides a tool to lower the cost of high performance resins while at the same time retaining many of the desirable properties and/or providing improved properties such as increased processability. The most successful alloying procedures result in a controlled and stable morphology with a singular thermodynamic profile. However, even when alloying is not "complete" in the multi-component system useful compositions can result.

The compatibilizer Poly(lactic acid-co-glycolic acid) (PLGA) were prepared by ring-opening polymerization of both cyclic monomers lactide and glycolide. The comonomer of glycolic acid in the copolymer is ranging from 1% to 50%, and prefer from 5% to 45%, from 10% to 40%, from 15% to 35%, etc. The prepared copolymer had MFR ~50, and in the form powders or flakes, or pellets. During the melt blending of PGA and PLA with adding of the compatibilizer PLGA, the desired case is that compatibilizer PLGA was dispersed in interphase between PGA and PLA, the part of PLA of the copolymer PLGA mixed in the PLA phase, while the PGA of the copolymer PLGA mixed in the PLA phase, so the copolymer PLGA increase the interfacial bonding between PGA and PLA phase, making the minor phase size smaller and reducing the interfacial defects. So the principle is to use A-co-B copolymer (as compatibilizer) to compatibilize polymer blend A/B.

Other Additives

Examples of other additives that may be further contained in the PGA composition of the present invention are additives which are ordinarily compounded with PGA compositions such as plasticizers (polyester plasticizers, glycerin plasticizers, polyhydric carboxylic acid ester plasticizers, phosphoric acid ester plasticizers, polyalkylene glycol plasticizers, epoxy plasticizers, and the like), antioxidants, thermal stabilizers, end capping agents, UV absorbers, flame retardants (bromine flame retardants, phosphorus flame retardants, antimony compounds, melamine compounds, and the like), lubricants, waterproofing agents, water repellents, mold releasing agents, waxes, colorants such as dyes or pigments; oxygen absorbers, crystallization accelerators, nucleating agents, hydrogen ion concentration adjusting agents, and fillers other than inorganic fillers. Two or more types of these other additives may also be mixed and contained in the composition. The content of the other additives is ordinarily at most 10 parts by mass and preferably at most 5 parts by mass per 100 parts by mass of the PGA, and the content may also be 1 part by mass or lower.

End-Capping Agent

Of these additives, a carboxyl group end-capping agent or a hydroxyl group end-capping agent is blended into the PGA composition, in particular, the degradability—in particular, the hydrolyzability—of the PGA composition can be controlled, and the storability of the PGA composition can be improved. That is, by blending a carboxyl group end-capping agent or a hydroxyl group end-capping agent into the composition, the unanticipated degradation of the resulting PGA composition during storage until use in molding or another process can be suppressed, and which makes it possible to suppress decreases in molecular weight and to adjust the speed of hydrolysis or biodegradation of the PGA composition. As an end-capping agent, it is possible to use a compound known as a water resistance improving agent for a PGA having a carboxyl group end-capping action or a hydroxyl group end-capping action. A carboxyl group end-capping agent is preferable as an end-capping agent from the perspective of the balance of the hydrolyzability or biodegradability and the hydrolysis resistance during storage. Examples of carboxyl group end-capping agents include carbodiimide compounds such as N,N'-2,6-diisopropyl phenyl carbodiimide; oxazoline compounds such as 2,2'-m-phenylene bis(2-oxazoline), 2,2'-p-phenylene bis(2-oxazoline), 2-phenyl-2-oxazoline, and styrene-isopropenyl-2-oxazoline; oxazine compounds such as 2-methoxy-5,6-dihydro-4H-1,3-oxazine; epoxy compounds such as N-glycidyl phthalimide, cyclohexene oxide, and tris(2,3-epoxypropyl) isocyanurate; and the like. Of these carboxyl group end-capping agents, carbodiimide compounds are preferable. Any of aromatic, alicylic, and aliphatic carbodiimide compounds can be used, but aromatic carbodiimide compounds are particularly preferable, and compounds with high purity, in particular, provide a water resistance improving effect during storage. In addition, diketene compounds, isocyanates, and the like can be used as hydroxyl end-capping agents. The carboxyl end-capping agent or hydroxyl end-capping agent is typically used at a ratio of 0.01 to 5 parts by mass, preferably from 0.05 to 3 parts by mass, and more preferably from 0.1 to 1 part by mass per 100 parts by mass of the PGA.

In addition, when the PGA composition contains a thermal stabilizer, the heat deterioration at the time of molding or the like can be suppressed, and the long-term storability of the PGA composition improves, which is more preferable. Examples of thermal stabilizers include phosphoric acid esters having a pentaerythritol skeleton structure such as cyclic neopentane tetrayl bis(2,6-di-tert-butyl-4-methylphenyl) phosphite, cyclic neopentane tetrayl bis(2,4-di-tert-butylphenyl) phosphite, and cyclic neopentane tetrayl bis(octadecyl)phosphite; alkyl phosphate esters or alkyl phosphite esters having an alkyl group with preferably from 8 to 24 carbon atoms such as mono- or di-stearyl acid phosphates or mixtures thereof [a known commercially available product is a mixture of approximately 50 mass % of monostearyl phosphate and approximately 50 mass % of distearyl phosphate (trade name "AX-71" made by ADEKA Co., Ltd.)]; carbonates such as calcium carbonate and strontium carbonate (which may also be contained as inorganic fillers); hydrazine compounds typically known as polymerization catalyst deactivators having —CONHNH—CO- units such as bis [2-(2-hydroxybenzoyl) hydrazine]dodecanoic acid and N,N'-bis [3-(3,5-di-t-butyl-4-hydroxyphenyl) propionyl]hydrazine; triazole compounds such as 3-(N-salicyloyl)amino-1,2,4-triazole; and triazine compounds. These thermal stabilizers may each be used alone or in a combination of two or more types thereof. The thermal stabilizer is typically used at a ratio of at most 3 parts by mass, preferably from 0.001 to 1 part by mass, more preferably from 0.005 to 0.5 parts by mass, and particularly preferably from 0.01 to 0.1 parts by mass (100 to 1,000 ppm), per 100 parts by mass of the PGA.

Polyglycolic Acid Resin Composition

The PGA composition of the present invention is a PGA composition containing from 50 to 90 mass % of a PGA, from 50 to 10 mass % of a PLA with a compatibilizer. The reaction product may have a tensile strength of at least about 12,000 psi.

The PGA composition of the present invention may be of any shape or form such as a raw material for molding such as a pellet, strand, or powder (including melt-mixed compositions and compositions obtained by melt-kneading using an extruder as described below), a sheet, a film, an extrusion-molded product, an injection-molded product, a compression-molded product, a blow-molded product, or a laminate or other composite thereof.

FIG. 1A is a cross-section view of an exemplary downhole tool member 100 that may incorporate the principles of the present disclosure. The downhole tool member 100, alternately referred to as a "frac plug," has one or more dissolvable component parts and is configured to anchor itself to casing or liner that lines the inner wall of a wellbore. As described herein, the frac plug 100 may incorporate or otherwise include a closable flow path designed to allow flow from below (i.e., downhole), but prevent flow from above (i.e., uphole), and may thus operate as a temporary one-way check valve.

As illustrated, the frac plug 100 may include a mandrel cone 120, a sealing element 140, a slip 160. A casing 180 is also illustrated. Some or all of the foregoing parts may be made of any of the dissolvable materials mentioned herein and otherwise degradable upon coming into contact with specific solvents. The individual parts of the frac plug 100 may dissolve at the same rate or at different rates by design. Some of the parts may be manufactured with two or more dissolvable alloys, which allows the alloy located along the outside (e.g., further from the centerline of the frac plug 100) to dissolve slowly and the alloy located inside (e.g., closer to the centerline of the frac plug 100) to dissolve more quickly, or vice-versa. The dissolving properties of any of the parts may be affected by pressure, temperature, or a concentration of solvent.

In at least one embodiment, some or all of the parts of the frac plug 100 may be made of a dissolvable material that includes a primary metal material alloyed with other elements and layered into place by advanced powder technology chemical processing. In some embodiments, the primary metal material may be magnesium, and the powder composition may be determined by the ratio of magnesium to other metal powders used to layer the rough material shapes of the parts. The material may then be consolidated with a combination of heat and pressure, and the resulting material can then be heat treated to the desired material strength.

Dissolvable parts of the frac plug 100 may dissolve when in contact with fresh water or salt water. In at least one embodiment, a strong acid such as hydrochloric acid, sulfuric acid, or perchloric acid can accelerate the dissolution of the frac plug 100. In some embodiments, for example, hydrochloric acid can be spotted (injected) just above (uphole) from the frac plug 100 to speed the dissolution process.

Mandrel cone 120 may include, for example, at an upper end 130, a lower end 150, and a ball seat 110. Ball seat 110 is dimensioned to receive frac balls in ways known in the art, which frac balls may, in a preferred embodiment, be a degradable metal or degradable polymer such as an acid polymer.

Degradable or dissolvable means substantially degradable or dissolvable in a downhole fluid which may be a naturally occurring fluid or may be an introduced fluid. It may be fresh water, a brine, an acid solution or frac fluid or other fluid.

Mandrel cone 120 may include inner walls 122, and outer walls 124.

The slip 160, and the sealing element 140 may each extend at least partially over the conical outer surface of the outer walls 124 of the mandrel cone 120. At least the slip ring 160 and the sealing element 140 may have corresponding angled inner surfaces configured to slidingly engage the conical outer surface of the outer walls 124 of the mandrel cone 120. The sealing element 140 may be made of any of the degradable rubber materials mentioned herein, but could alternatively be made of a non-degradable material, without departing from the scope of the disclosure. There may comprise a spiral wound member (not shown) that interposes the slip 160 and the sealing element 140 and may operate to prevent the elastomeric material of the sealing element 140 from extruding, deforming, or otherwise creeping axially when the frac plug 100 is set.

Plugs 120 may be typically run in with a setting tool that may be ballistic, hydraulic, electric or mechanical as known in the art. Setting tools typically set the plug by pulling the bottom of the plug up relative to its top, the longitudinal compression of the plug moves the split rings radially outward to engage an inner wall of the casing 180. Further pulling upwards on the bottom of the plug compresses the plug's slips and wedges (or cones) longitudinally against the plugs' split rings, forcing the rings radially outward against the casing. Being forcefully pressed radially against the casing, the split rings or non-split rings sealingly engage the inner wall of the casing 180, creating a functional seal against fluid flow between the plug and casing as shown in 1B.

The disclosed embodiments permit the sealing element 140 to be comprised of a metallic split ring or in addition to a solid, unsplit rubber or rubberlike elastomer. In some of the disclosed embodiments, a sealing element 140 is shown which does not "gum up" the milling head or leave gummy debris in the hole when drilled out. In some of the disclosed embodiments, a metal or non-metal split ring or non-split ring sealing element does not have to be drilled out, but rather degrades together with the plug generally in the presence of downhole fluids or fluids added at the wellhead.

Even at lower wellbore fluid temperatures, such as about 200° F. or less, an expandable split ring embodiment serves functions similar to a conventional rubber or rubber-like elastomer seal, namely to seal the plug against the casing to substantially preclude fluid movement around the plug and through the casing. When compressed between the plug's cone elements and slips during setting, the outer face surface of the expandable split or non-split ring radially expands against the well casing, sealing the plug to the casing.

Figure 2:
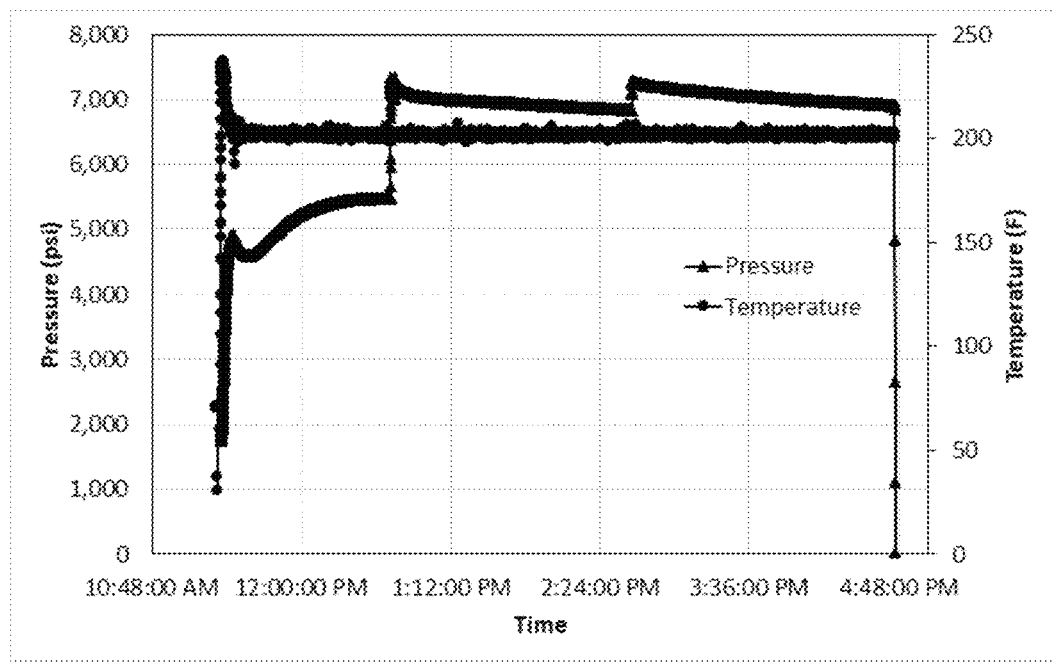
FIG. 2 shows a chart of a holding test at 7,250 psi (50 Mpa) and at 93° C. (200° F.) for 4 hours.

As shown in FIG. 2, the plug was set vertically at room temperature. The setting force was around 23,200 lbs. After setting, water was poured on the upper zone and there was no leaking. Then the plug passed the 7,250 psi ambient pressure test.

Additionally, the plug successfully passed 7,250 psi (50 Mpa) at 200F (93° C.) for 4 hours. During the posttest inspection, the extrusion of element was not found. Some deformation was observed on the PGA cone. The plug has not moved down to bottom of the casing.

Figure 3:
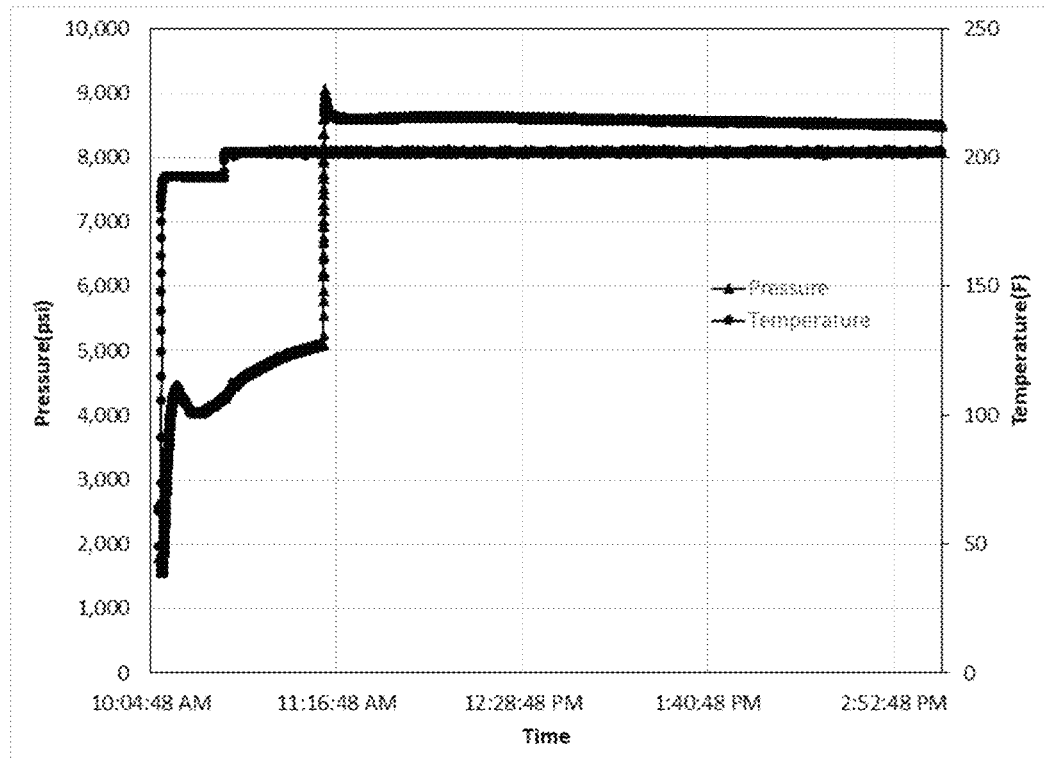
FIG. 3 shows a chart of a holding test at 8,700 psi (60 Mpa) and at 93° C. (200° F.) for 4 hours.

As shown in FIG. 3, the plug successfully passed a pressure holding test at 8,700 psi (60 Mpa) and at 93° C. (200° F.) for 4 hours.

Figure 4:
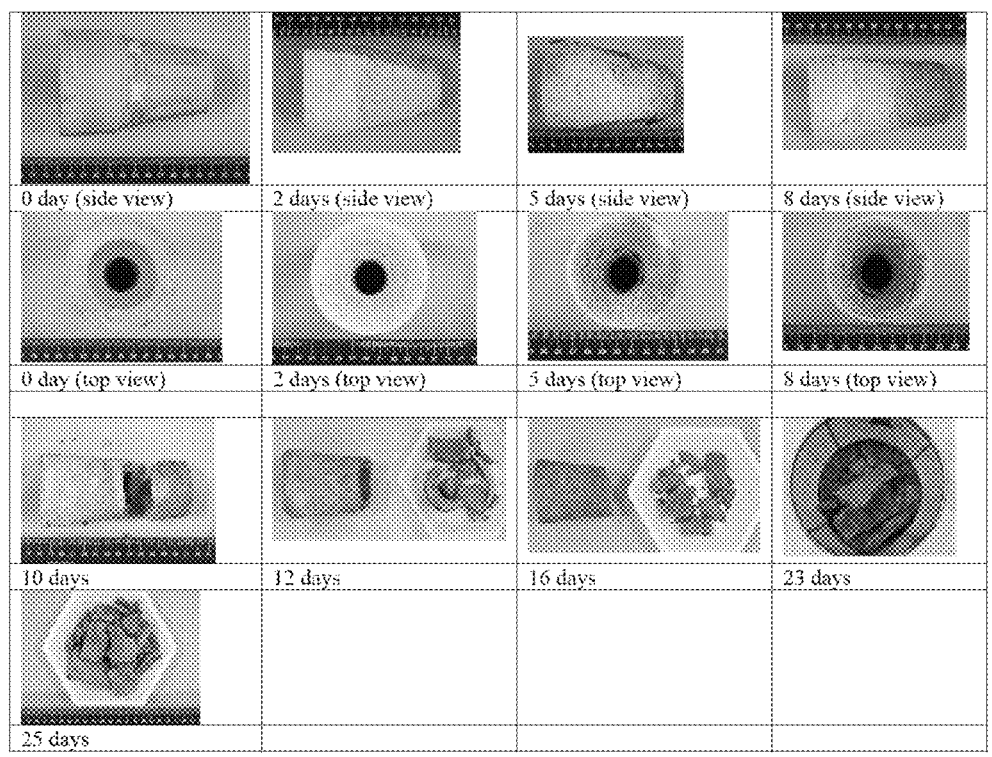
FIG. 4 shows a series of images of the mandrel cone of modified PGA at different immersion time at 80° C.

FIG. 4 shows the photos of the mandrel cone of modified PGA at different immersion time at 80° C. The mandrel cone did have pressure holding test at 7,250 psi (50 Mpa) and at 93° C. for 4 hours prior to the immersion test at 80° C. with KCl solution.

Figure 5:
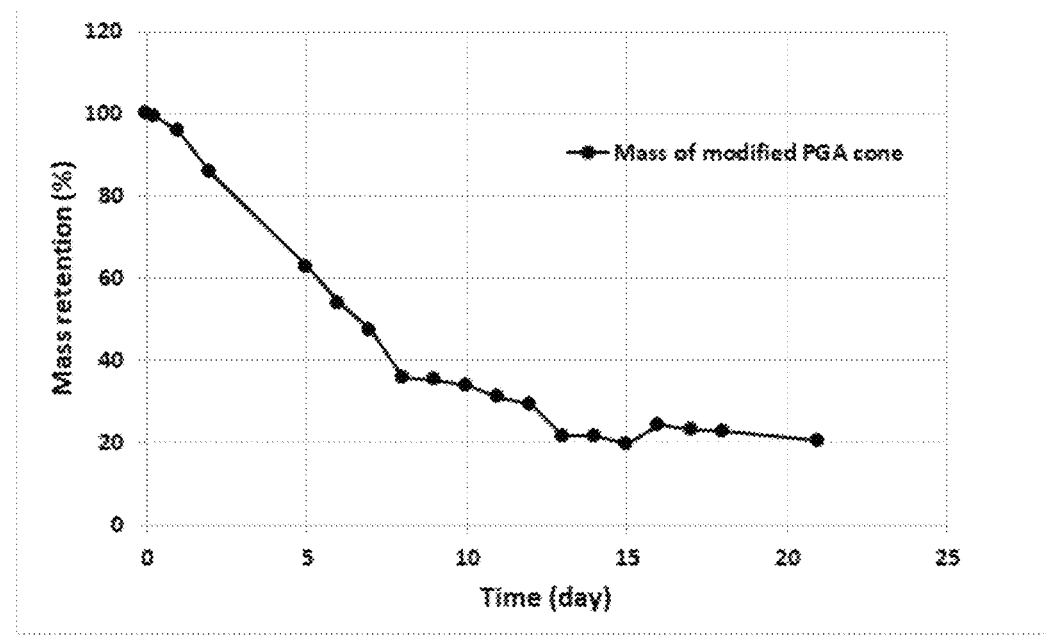
FIG. 5 shows a chart of mass loss test of the mandrel cone of modified PGA versus immersion time at 80° C.

FIG. 5 shows a mass retention test of the mandrel cone of modified PGA versus immersion time at 80° C. The mandrel cone did have pressure holding test at 7,250 psi (50 Mpa) and at 93° C. (200° F.) for 4 hours prior to the immersion test at 80° C. with KCl solution.

The percentage of mass loss of the PGA in the PGA composition of the present invention after immersion in water for 2 days at 80° C. (sometimes called the "percentage of mass loss after 2 days at 82220° C.") is at about 14%. Since the percentage of mass loss of the PGA of the present invention after 7 days at 80° C. is about 50%, the composition may have excellent moldability and mechanical characteristics as well as excellent heat resistance and hydrolyzability.

The percentage of mass loss of the PGA composition after 7 days at 80° C. is measured by the following method. Specifically, an evaluation test specimen with a dumbbell shape (the dumbbell shape specifications are in accordance with ISO 294) is created by injection molding, and the mass of the evaluation test specimen is measured. The mass of the PGA in the evaluation test specimen (called the "pre-test PGA mass" hereafter) is calculated with reference to the content ratio of the inorganic filler. After the retrieved evaluation test specimen is subjected to cold air blowing and vacuum drying to remove the water content, the mass of the evaluation test specimen is measured, and the mass of the PGA in the evaluation test specimen after the test (called the "post-test PGA mass" hereafter) is measured. The percentage of mass loss of the PGA composition after 6 days at 90° C. is calculated from the following calculation formula.

Calculation Formula:

Percentage of mass loss after 6 days at 90° C. (%) =

$$(\text{pre-test } PGA \text{ mass} - \text{post-test } PGA \text{ mass})/\text{pre-test } PGA \text{ mass} \times 100$$

[Melt Flow Rate (MFR)]

The melt flow rate (MFR) of the PGA contained in the PGA composition of the present invention is ordinarily preferably within a range of from 0.1 to 100 g/10 min, more preferably within a range of from 1 to 80 g/10 min, and even more preferably within a range of from 2 to 20 g/10 min. The MFR of the PGA composition is expressed as the amount of fluid flow (g) per 10 minutes measured at a temperature of 240° C. under a load of 2.16 kg. When the MFR of the PGA composition is too high, it may not be possible to secure molding workability depending on the production process, or the mechanical characteristics such as the strength of a product obtained from the PGA composition may be insufficient. When the MFR of the PGA composition is too low, it may become difficult to mold the PGA composition, which may prevent a product obtained from a PGA composition having the desired characteristics from being obtained.

[Mechanical Characteristics]

The PGA composition of the present invention has an excellent balance of mechanical characteristics. Specifically, the following conditions required as mechanical properties can be met:
- (a) the Charpy impact strength (according to ISO 179) is at least 3 KJ/m2, preferably at least 4 KJ/m2, and more preferably at least 5 KJ/m2;
- (b) the tensile strength (according to ISO 527) is at least 50 MPa and preferably at least 70 MPa;
- (c) the elasticity (according to ISO 527) is at least 1% and preferably at least 1.5%;

Method For Producing Polyglycolic Acid Resin Composition

The method for producing the PGA composition of the present invention is not particularly limited as long as it is possible to obtain a PGA composition containing polyglycolic acid and polylactic acid in a weight ratio of from about 100:0, or 99:1 to about 50:50 in mixture with a compatibilizer, wherein the reaction product has a tensile strength of at least about 12,000 psi.

A step of injection molding using an extruder refers to a step of supplying a raw material containing polyglycolic acid and polylactic acid in a weight ratio of from about 99/1 to about 50/50 in mixture with a compatibilizer to an extruder provided with a screw and a cylinder, heating and melting the raw material while heating the raw material based on external heating and shear heating, extruding the material into a shape such a rod shape, and if desired, cutting the material into pellets of with a length of approximately a prescribed number of mm so as to form a PGA composition having a prescribed material composition.

In particular, a PGA composition obtained by a method for producing a PGA composition including a step of injection molding using a single screw extruder has good dispersion/distribution efficiency and can be formed into a product of a PGA composition having various forms/shapes such as a sheet, a film, or an injection-molded product, and a product made of the PGA composition having excellent moldability, mechanical characteristics, heat resistance, hydrolyzability, and biodegradability can thus be obtained, which is preferable.

An extruder provided with a main feed port and a side feed port is an extruder which is provided with both a main feed port for supplying most of the material for forming the PGA composition such as a PGA, a PLA, and compatibilizer (ordinarily in the form of a solid) to the extruder at a position on the screw driver part side of the extruder, and a side feed port for supplying part of the material for forming the PGA composition to the extruder at a position in the middle of the main feed port and an extrusion port (nozzle) on the tip side of the screw of the extruder. With respect to the cylinder length (L) of the extruder, the side feed port can ordinarily be provided from 0.2 to 0.9 L, preferably from 0.4 to 0.8 L, and more preferably from 0.5 to 0.75 L from the screw driver part side.

The supply of the PGA to the extruder from the main feed port and/or the side feed port can itself be achieved by a known method and mechanism. For example, a method in which the materials are supplied to the extruder via a hopper installed on the main feed port and/or the side feed port may be used, or a method in which the materials are supplied to the extruder via a feeder or an extruder installed on the main feed port and/or the side feed port may be used.

As described above, the extruder provided with a screw and a cylinder and having functions of heating, melting the raw material based on external heating and shear heating. Most of the material for forming the PGA composition that is supplied from the main feed port—the PGA, the PLA, and compatibilizer, in particular—is in a solid form, and after the material is heated and melted based on external heating and shear heating, it is sent to the extrusion port (nozzle) in a molten fluid state. Accordingly, in the method for producing a PGA composition according to the present invention, the thermal history such as the shear heat generation in the PGA composition can be adjusted from the main feed port and the side feed port.

EXAMPLES

The PGA composition of the present invention will be described in further detail hereinafter using working examples and comparative examples. The present invention is not limited to these working examples. The characteristics of the PGA and the PGA composition were measured with the following methods.

The Compounded Sample Preparation and Test

Injection molding was conducted on a Toyo Plastar machine. For PGA/PLA blends, the materials were pre-mixed with pellets, then dried to moisture level below 0.025%, and then directly injection molded to create the ASTM D638 standard tensile bars and flexural specimens for further mechanical and degradation test. Detailed injection molding conditions are list in Table 1.

TABLE 1

| injection molding conditions | | | |
|---|---|---|---|
| | PGA | PGA/PLA blends | PLA |
| barrel temp (F.) | 473 | 473 | 400 |
| mold temp (C.) | 90 | 90 | 100 |
| injection speed | 72% | 72% | 72% |
| pack pressure (Psi) | 450-500 | 450-500 | 350 |
| pack time (sec) | 13 | 13 | 8 |
| screw recovery | 25+% | 8% | 25+% |
| Back Pressure (Psi) | 40 | 40 | 40 |

Besides injection molding, the polymer compounds can be molded with compression molding, as well as extrusion molding.

(Weight Average Molecular Weight (Mw) and Molecular Weight Distribution (Mw/Mn))

The weight average molecular weight (Mw) of the PGA was obtained using a GPC analysis apparatus. Specifically, after 10 mg of a PGA sample was dissolved in hexafluor-oisopropanol (HFIP) in which sodium trifluoroacetate was dissolved at a concentration of 5 mM to form 10 mL, the solution was filtered with a membrane filter to obtain a sample solution. 10 µL of this sample solution was injected into the GPC analysis apparatus, and the weight average molecular weight (Mw) and the molecular weight distribution (Mw/Mn) were determined from the results found by measuring the molecular weight under the following measurement conditions.

<GPC Measurement Conditions>
  Apparatus: GPC104 manufactured by Showa Denko K.K.
  Columns: two HFIP-806M columns (connected in series)+one HFIP-LG precolumn manufactured by Showa Denko K.K.
  Column temperature: 40° C.
  Eluent: HFIP solution in which sodium trifluoroacetate was dissolved at a concentration of 5 mM
  Detector: differential refractometer
  Molecular weight calibration: Calibration curve data for the molecular weight was created using five types of methyl polymethacrylate (manufactured by Polymer Laboratories Ltd.) with different standard molecular weights.

(Melting Point (Tm) and Glass Transition Temperature (Tg))

The melting point (Tm) and the glass transition temperature (Tg) of the PGA were determined in a nitrogen atmosphere using a differential scanning calorimeter (DSC; Q20, TA Instruments.).

[Melt Flow Rate (MFR)]

The melt flow rate (MFR) of the PGA and the PGA composition was measured as the amount of fluid flow (g) per 10 minutes measured at a temperature of 240° C. under a load of 2.16 kg.

[Tensile Strength and Elasticity]

The tensile strength and elasticity of the PGA composition were measured in accordance with ISO 527.

Tensile tests were conducted on the injection molded tensile bars using the MTS QTest/50LP equipped with a 2 in extensometer. Five random samples were taken and measured following the ISO 527 method. The sample width and thickness in the waisted area and the testing speed 10 mm/min.

The degradation testing was conducted with same 0.3 wt % KCl aqueous solution in glass jars at the designed temperature (e.g. 90° C.).

Result and Discussions:

Tensile properties test results on the modified PGA formulations from the same batch injection molding were listed in Table 2. The tensile strength of PGA/PLA 95/5, 90/10, and PGA/PLA/PLGA 90/10/1 is about 2%-7% higher than the pure PGA. The copolymer PLGA used has a copolymer composition of 75% LA and 25% GA.

From Table 2, after blending with PLA to binary blend, the elongation at break of PGA/PLA blend (95/5, 90/10, 80/20, 70/30) decrease from 7% of PGA to 1.6% of PGA/PLA 70/30. This is caused by the poor interfacial bonding between PGA and PLA phases. Therefore, we introduce the PLGA compatibilizer to improve the elongation at break via improve the interfacial bonding.

With the adding compatibilizer copolymer Poly(LA-co-GA) (PLGA), the elongation at break for PGA/PLA/PLGA increase comparing with the PGA/PLA blend without compatibilizer PLGA. For 80/20 blends, the elongation break increase from 1.8% of PGA/PLA 80/20 to >10.4% of PGA/PLA/PLGA 80/20/1 and >16.4% of PGA/PLA/PLGA 80/20/2 (with adding the compatibilizer PLGA). For 70/30 blends, the elongation break increase from 1.6% of PGA/PLA 70/30 to >12.1% of PGA/PLA/PLGA 70/30/3 (with adding the compatibilizer PLGA). For 90/10 blends, the elongation break increases from 26% of PGA/PLA 90/10 to 3% of PGA/PLA/PLGA 90/10/1 (with adding the compatibilizer PLGA).

80/20/1 and 80/20/2 obviously increase (10.4% or larger) comparing the one without compatibilizer PGA/PLA 80/20 (1.8%). This indicates the compatibilizer increases the interphase bonding between the PGA and PLA phases (domains), and as a result increase the toughness of the blends. The same effect for PGA/PLA/PLGA 70/30/3 (with compatibilizer PLGA) comparing with PGA/PLA 70/30 without compatibilizer PLGA (the elongation at break >12.1% for PGA/PLA/PLGA 70/30/3 is higher than 1.6% of PGA/PLA 70/30 without compatibilizer.

Besides the obvious increase in elongation at break for PGA/PLA/PLGA with adding compatibilizer PLGA. Their tensile strength the tensile strength also slight increase with adding compatibilizer PLGA. For 90/10 blend, tensile strength increases from 16006 psi of PGA/PLA 90/10 to 16159 psi for PGA/PLA/PLGA 90/10/1 (with adding compatibilizer PLGA). For 80/20 blend, tensile strength increases from 14367 psi of PGA/PLA 80/20 to 14415 psi for PGA/PLA/PLGA 80/20/1 (with adding compatibilizer PLGA). For 70/30 blend, tensile strength increases from 12726 psi of PGA/PLA 70/30 to 13129 psi for PGA/PLA/PLGA 70/30/3 (with adding compatibilizer PLGA).

So based on the test result of elongation at break and tensile strength, adding compatibilizer PLGA improves the PGA/PLA toughness and properties.

TABLE 2

Tensile properties of the formulations

| Formulations | Tensile strength (psi) | Tensile strength (MPa) | Elongation at break (%) | Modulus (MPa) |
|---|---|---|---|---|
| PGA | 15615 | 107.7 | 7.0 | 7611.8 |
| PGA/PLA 95/5 | 16765 | 115.6 | 5.0 | na |
| PGA/PLA 90/10 | 16006 | 110.4 | 2.0 | 7645.0 |
| PGA/PLA/PLGA 90/10/1 | 16159 | 111.4 | 3.3 | 7128.4 |
| PGA/PLA 80/20 | 14367 | 99.1 | 1.8 | 7483.0 |
| PGA/PLA/PLGA 80/20/1 | 14415 | 99.4 | >10.4 | 6105.3 |
| PGA/PLA/PLGA 80/20/2 | 12892 | 88.9 | >16.5 | 5749.7 |
| PGA/PLA 70/30 | 12726 | 87.7 | 1.6 | 6687.0 |

TABLE 2-continued

Tensile properties of the formulations

| Formulations | Tensile strength (psi) | Tensile strength (MPa) | Elongation at break (%) | Modulus (MPa) |
|---|---|---|---|---|
| PGA/PLA/PLGA 70/30/3 | 13129 | 90.4 | >12.1 | 6078.0 |
| PLA | 10060 | 69.4 | 4.9 | 3861.8 |

The Degradation

The degradation testing of plagues of different formulations were conducted with 0.3 wt % KCl aqueous solution in glass jars at the designed temperature (e.g. 90° C.). The well dispersed small phase (or domains) will not delay the degradation of the blend.

The Morphology

It clearly shows that the well dispersed PLA sphere phase (a few micron (~5 micron or smaller) for PGA/PLA 90/10)) is within the PGA matrix. After 7 days degradation at 70° C., the PGA were degraded fast and were removed from the surface, the PLA still maintain the sphere (or domain) dispersed phase within the PGA matrix as PLA degraded very slow at 70° C. comparing with PGA. This is like etching process to remove easy etched first component (here is PGA) and show the phase structure of second component (here is the dispersed PLA).

Also, the PLA dispersed sphere size is around or smaller than 5 microns for PGA/PLA 90/10, where about 20 microns dispersed phase (domains) are for PGA/PLA 70/30. This indicates that with increasing the percentage of PLA from 10% to 30%, the size of PLA dispersed phase (domain or droplets) greatly increases from 5 micron to 20 micron.

There are clear boundary between the two phases of PGA and PLA blend, where are the disperse phase (domain) of PLA and matrix (continual) phase of PGA. This indicates very limited interfacial bonding between two phases. But with adding the compatibilizer PLGA, PGA/PLA/PLGA 90/10/1 didn't show clear boundary comparing with PGA/PLA 90/10 without compatibilizer. So the compatibilizer does enhance the interfacial bonding between PGA and PLA phases, thus toughening the blends with obviously improved elongation at break and slightly improved tensile strength.

In conclusion, from the tensile properties, degradation and morphology study, the new developed formulations are suitable for molded (e.g. injection molding, extrusion molding) degradable component for downhole tool application.

The above shows and describes the basic principles, main features and advantages of the utility patent application. Those skilled in the industry should understand that the present utility patent application is not limited by the above-mentioned embodiments. The above-mentioned embodiments and the description are only preferred examples of the present utility patent application and are not intended to limit the present utility patent application, without departing from the present utility patent application. Under the premise of spirit and scope, the present utility patent application will have various changes and improvements, and these changes and improvements fall within the scope of the claimed utility patent application. The scope of protection claimed by the utility patent application is defined by the appended claims and their equivalents.

We claim:

1. A downhole tool member for hydrocarbon resource recovery, comprising:
   a shaped body comprising a degradable polymer matrix, wherein the degradable polymer matrix comprises 50 to 98 mass % of a polyglycolic acid (PGA), from 50 to 2 mass % of a polylactic acid (PLA) with about 1%-about 3% compatibilizer,
   wherein the downhole tool member, when held in downhole fluid at about 80° C., has an initial mass loss of about 14% for a holding period of about 2 days in a pressure holding test, wherein the downhole fluid comprises aqueous solution.

2. The downhole tool member according to claim 1, wherein the mass loss is about 50% for a holding period of about 7 days in the pressure holding test.

3. The downhole tool member according to claim 1, wherein the polyglycolic acid comprises polyglycolic acid resin.

4. The downhole tool member according to claim 1, wherein the downhole tool member holds pressure ranging from about 6500 psi to about 10000 psi at about 93° C. for up to about 24 hours in the pressure holding test.

5. The downhole tool member according to claim 1, wherein the aqueous solution comprises KCl solution.

6. The downhole tool member according to claim 1, wherein the degradable polymer comprises a copolymer of two or more aliphatic polyesters copolymer.

7. The downhole tool member according to claim 6, wherein the copolymer comprises poly(lactic acid-co-glycolic acid) (PLGA).

8. The downhole tool member according to claim 7, wherein the copolymer poly(lactic acid-co-glycolic acid) (PLGA) ranges from about 0 part to about 6 parts (considering polyglycolic acid (PGA) and polylactic acid (PLA) as about 100 parts, where PLA ranges from about 1 part to about 30 parts.

9. A downhole tool member for hydrocarbon resource recovery, comprising:
   a shaped body comprising a degradable polymer matrix, wherein the degradable polymer matrix comprises 50 to 98 mass % of a polyglycolic acid (PGA), from 50 to 2 mass % of a polylactic acid (PLA) with about 1%-about 3% compatibilizer,
   wherein the downhole tool member hold pressure in a downhole fluid ranging from 6500 psi to 10000 psi at about 93° C. for up to about 24 hours in a pressure holding test, wherein the downhole fluid comprises aqueous solution.

10. The downhole tool member according to claim 9, wherein the downhole tool member, when held in downhole fluid: at 80° C., has an initial mass loss about 14% for a holding period of about 2 days in the pressure holding test.

11. The downhole tool member according to claim 9, wherein the polyglycolic acid comprises polyglycolic acid resin.

12. The downhole tool member according to claim 9, wherein the polymer comprises a copolymer of two or more aliphatic polyesters.

13. The downhole tool member according to claim 12, wherein the copolymer comprises poly(lactic acid-co-glycolic acid) (PLGA).

14. The downhole tool member according to claim 9, wherein the downhole tool member holds pressure ranging from about 6500 psi to about 10000 psi at about 93° C. for up to about 24 hours in a pressure holding test.

15. A downhole tool member for hydrocarbon resource recovery, comprising:
   a shaped body comprising a degradable polymer matrix, wherein the degradable polymer matrix comprises 50 to 98 mass % of a polyglycolic acid (PGA), from 50 to 2 mass % of a polylactic acid (PLA) with about 1%-about 3% compatibilizer,
   wherein the downhole tool member, when held in downhole fluid at about 80° C., has a mass loss of about 50% for a holding period of about 7 days in a pressure holding test, wherein the downhole fluid comprises aqueous solution.

16. The downhole tool member according to claim 15, wherein the polymer comprises copolymer, wherein the copolymer comprises poly(lactic acid-co-glycolic acid) (PLGA).

17. The downhole tool member according to claim 16, wherein the downhole tool member, when held in downhole fluid at about 80° C., has an initial mass loss about 14% for a holding period of about 2 days in the pressure holding test.

18. The downhole tool member according to claim 16, wherein the downhole tool member, when held in downhole fluid at about 80° C., has a mass loss about 50% for a holding period of about 7 days in the pressure holding test.

* * * * *